US010986283B2

(12) United States Patent
Lin et al.

(10) Patent No.: US 10,986,283 B2
(45) Date of Patent: Apr. 20, 2021

(54) DEVICE FOR INSPECTING MASK PLATE, METHOD FOR INSPECTING MASK PLATE, AND CORRESPONDING METHOD FOR CONTROLLING LIGHT SOURCES

(71) Applicants: ORDOS YUANSHENG OPTOELECTRONICS CO., LTD., Ordos (CN); BOE TECHNOLOGY GROUP CO., LTD., Beijing (CN)

(72) Inventors: Zhiming Lin, Beijing (CN); Chunchieh Huang, Beijing (CN); Bili Baiyin, Beijing (CN); Zhiyuan Hao, Beijing (CN); De Zhang, Beijing (CN); Xiaolin Xin, Beijing (CN); Xu Liu, Beijing (CN); Dongwei Li, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/338,350

(22) PCT Filed: Aug. 13, 2018

(86) PCT No.: PCT/CN2018/100185
§ 371 (c)(1),
(2) Date: Mar. 29, 2019

(87) PCT Pub. No.: WO2019/062351
PCT Pub. Date: Apr. 4, 2019

(65) Prior Publication Data
US 2019/0356835 A1 Nov. 21, 2019

(30) Foreign Application Priority Data
Sep. 30, 2017 (CN) .......................... 201710927502.2

(51) Int. Cl.
*H04N 5/235* (2006.01)
*G06T 7/00* (2017.01)

(52) U.S. Cl.
CPC ......... *H04N 5/2354* (2013.01); *G06T 7/0004* (2013.01); *G06T 2207/30121* (2013.01)

(58) Field of Classification Search
CPC ................ H04N 5/2354; G06T 7/0004; G06T 2207/30121
See application file for complete search history.

(56) References Cited

U.S. PATENT DOCUMENTS 7,375,360 B2   5/2008  Kim
8,335,369 B2  12/2012  Huang et al.
(Continued)

FOREIGN PATENT DOCUMENTS

CN      1818626 A    8/2006
CN    101256551 A    9/2008
(Continued)

OTHER PUBLICATIONS

International Search Report and English Translation of Box V of the Written Opinion dated Nov. 13, 2018, for corresponding PCT Application No. PCT/CN2018/100185.
(Continued)

*Primary Examiner* — Thai Q Tran
*Assistant Examiner* — Sunghyoun Park
(74) *Attorney, Agent, or Firm* — Kinney & Lange, P.A.

(57) ABSTRACT

The embodiments of the present disclosure propose a device for inspecting a mask plate, a method for inspecting a mask plate, and a corresponding method for controlling light sources. The device includes: an image sensor configured to capture an image of the mask plate; and a plurality of light sources disposed on one side of the mask plate opposite to the image sensor, wherein at least one of the plurality of light (Continued)

sources is configure to emit light when the image sensor is capturing an image of a first region of the mask plate, and the at least one light source comprises light sources within a first range, wherein the first range corresponds to the first region and an orthographic projection of the image sensor on a light source plane falls within the first range. The method for controlling light sources includes: turning on at least one of a plurality of light sources disposed on one side of the mask plate opposite to an image sensor, which corresponds to a first region of the mask plate to be inspected, when the image sensor is moved to a position corresponding to the first region.

6 Claims, 3 Drawing Sheets

(56) References Cited

U.S. PATENT DOCUMENTS

| | | | |
|---|---|---|---|
| 2004/0022677 A1* | 2/2004 | Wohlstadter | G01N 21/69 422/52 |
| 2006/0151725 A1 | 7/2006 | Kim | |
| 2008/0205743 A1 | 8/2008 | Huang et al. | |
| 2009/0148031 A1* | 6/2009 | Fukami | G01N 21/954 382/141 |
| 2011/0315297 A1* | 12/2011 | Koshio | G02F 1/1333 156/64 |
| 2015/0172575 A1* | 6/2015 | Adachi | H04N 5/2354 348/239 |
| 2017/0061596 A1 | 3/2017 | Han et al. | |
| 2017/0146545 A1* | 5/2017 | Chung | G01N 33/543 |

FOREIGN PATENT DOCUMENTS

| | | |
|---|---|---|
| CN | 102221563 A | 10/2011 |
| CN | 106711074 A | 5/2017 |
| CN | 107734272 A | 2/2018 |
| JP | 2000146850 A | 5/2000 |

OTHER PUBLICATIONS

Chinese Office Action dated May 15, 2019, or corresponding Chinese Application No. 201710927502.2.

* cited by examiner

DEVICE FOR INSPECTING MASK PLATE, METHOD FOR INSPECTING MASK PLATE, AND CORRESPONDING METHOD FOR CONTROLLING LIGHT SOURCES

CROSS-REFERENCE TO RELATED APPLICATION(S)

This application claims priority to the Chinese Patent Application No. 201710927502.2, filed on Sep. 30, 2017, which is incorporated herein by reference in its entirety.

TECHNICAL FIELD

The present disclosure relates to the field of display technology, and more particularly, to a device for inspecting a mask plate, a method for inspecting a mask plate, and a corresponding method for controlling light sources.

BACKGROUND

In a process of producing, for example, an Organic ELectroluminescence Display (OLED), in order to form an organic light emitting layer having a specified pattern (for example, a pixel pattern) on a substrate, it is usually realized by evaporating a luminescent material at a specified position using a mask. For example, in a case of using a Fine Metal Mask (FMM), the luminescent material of the OLED is evaporated on a backplane of Low Temperature PolySilicon (LTPS) according to a predetermined procedure. Specifically, red, green, and blue organic matters may be evaporated at specified positions using a pattern on the FMM. Therefore, the product yield of the process of producing the OLED is directly affected by the accuracy of the pattern on the mask plate.

SUMMARY

According to an aspect, the embodiments of the present disclosure provide a device for inspecting a mask plate. The device comprises: an image sensor configured to capture an image of the mask plate; and a plurality of light sources disposed on one side of the mask plate opposite to the image sensor, wherein at least one of the plurality of light sources is configure to emit light when the image sensor is capturing an image of a first region of the mask plate, and the at least one light source comprises light sources within a first range, wherein the first range corresponds to the first region and an orthographic projection of the image sensor on a light source plane falls within the first range.

In some embodiments, the at least one light source comprises light sources within a second range, wherein the second range is a predetermined range which comprises the first range and extends in an expected movement direction of the image sensor.

In some embodiments, remaining ones of the plurality of light sources other than the at least one light source are configure to not emit light when the image sensor is capturing the image of the first region of the mask plate.

In some embodiments, the plurality of light sources are disposed on a light source supporting structure, wherein the light source supporting structure enables the plurality of light sources to move with respect to the mask plate in a light-exiting direction.

According to another aspect, the embodiments of the present disclosure provide a method for inspecting a mask plate. The method comprises: moving an image sensor to a position corresponding to a first region of the mask plate to be inspected; controlling at least one of a plurality of light sources disposed on one side of the mask plate opposite to the image sensor to emit light; and capturing an image of the first region, wherein the at least one light source comprises light sources within a first range, wherein the first range corresponds to the first region and an orthographic projection of the image sensor on a light source plane falls within the first range.

In some embodiments, the at least one light source comprises light sources within a second range, wherein the second range is a predetermined range which comprises the first range and extends in an expected movement direction of the image sensor.

In some embodiments, the method further comprises: controlling remaining ones of the plurality of light sources other than the at least one light source to not emit light when the image sensor is capturing the image of the first region of the mask plate.

In some embodiments, the method further comprises: controlling the plurality of light sources to move with respect to the mask plate in a light-exiting direction by moving a light source supporting structure configured to support the plurality of light sources.

According to yet another aspect, the embodiments of the present disclosure provide a method for controlling light sources when a mask plate is inspected. The method comprises: controlling at least one of a plurality of light sources disposed on one side of the mask plate opposite to an image sensor to emit light when the image sensor is moved to a position corresponding to a first region of the mask plate to be inspected, wherein the at least one light source comprises light sources within a first range, wherein the first range corresponds to the first region and an orthographic projection of the image sensor on a light source plane falls within the first range.

In some embodiments, the at least one light source further comprises light sources within a second range, wherein the second range is a predetermined range which comprises the first range and extends in an expected movement direction of the image sensor.

In some embodiments, the method further comprises: controlling remaining ones of the plurality of light sources other than the at least one light source to not emit light when the image sensor is capturing an image of the first region of the mask plate.

In some embodiments, the method further comprises: controlling the plurality of light sources to move with respect to the mask plate in a light-exiting direction by moving a light source supporting structure configured to support the plurality of light sources.

BRIEF DESCRIPTION OF THE ACCOMPANYING DRAWINGS

The above and other purposes, features and advantages of the present disclosure will become more apparent from the description of the preferred embodiments of the present disclosure in conjunction with the accompanying drawings, in which.

DETAILED DESCRIPTION

Figure 1:
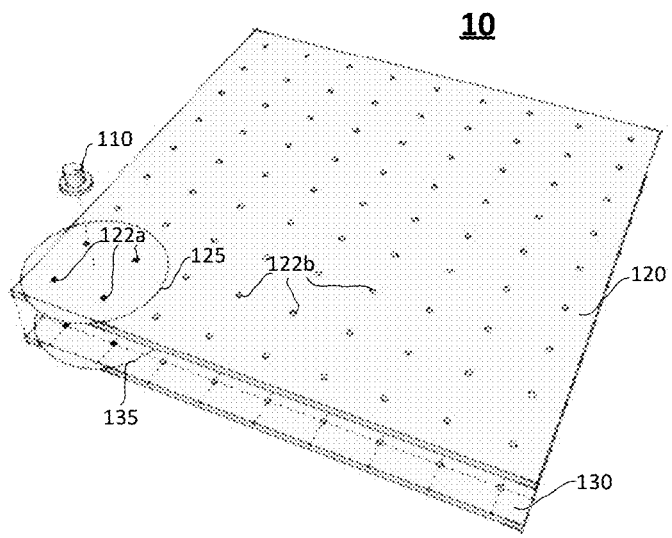
FIG. 1 is a schematic oblique view illustrating a device for inspecting a mask plate according to an embodiment of the present disclosure.

A part of the embodiments of the present disclosure will be described in detail below with reference to the accompanying drawings, and the details and functions which are not necessary for the present disclosure are omitted in the description, to avoid confusion of the understanding of the present disclosure. In the present specification, various embodiments described below for describing the principles of the present disclosure are merely illustrative and should not be construed as limiting the scope of the present disclosure in any way. The following description with reference to the accompanying drawings comprises numerous specific details are used to assist in a comprehensive understanding of the exemplary embodiments of the present disclosure which are defined by the claims and their equivalents. The following description comprises numerous specific details to assist in the understanding, but these details should be considered to be merely exemplary. Therefore, it will be apparent to those of ordinary skill in the art that various changes and modifications may be made to the embodiments described herein without departing from the scope and spirit of the present disclosure. In addition, descriptions of well-known functions and constructions are omitted for clarity and conciseness. In addition, the same reference signs are used throughout the accompanying drawings for the same or similar functions, devices and/or operations. In addition, in the accompanying drawings, various parts are not necessarily drawn to scale. In other words, relative sizes, lengths, etc. of various parts in the accompanying drawings do not necessarily correspond to actual ratios.

In the present disclosure, the terms "comprise" and "comprising" and their derivatives are intended to be inclusive and not limiting; and the term "or" is inclusive, meaning and/or. In addition, in the following description of the present disclosure, the orientation terms used, such as "upper", "lower", "left", "right", etc., are used to indicate relative positional relationships to assist those skilled in the art in understanding the embodiments of the present disclosure. Further, it should be understood by those skilled in the art that "upper"/"lower" in one direction may become "lower"/"upper" in an opposite direction, and may become another positional relationship, such as "left"/"right", etc., in another direction.

Hereinafter, the application of the present disclosure to inspection of quality of a mask plate is taken as an example. However, it should be understood by those skilled in the art that the application field of the present disclosure is not limited thereto. In fact, the device and the method according to the embodiments of the present disclosure may be applied to any scenario in which the image sensor needs to cooperate with light sources.

In a conventional method of manufacturing a mask pate, in order to ensure the accuracy of a pattern on the mask plate, the mask plate is photographed by a device for inspecting quality of the mask plate using a Charge Coupled Device (CCD) image sensor to check whether positions of openings of the mask plate are accurate. In this case, a position of a backlight which provides illumination to the CCD image sensor should be synchronized with a position of the CCD image sensor on top of the backlight. However, the backlight is actually not fully synchronized with the CCD image sensor when the backlight and the CCD image sensor are moved in a synchronized manner. More specifically, in most cases, the backlight is moved slower than the CCD image sensor, which only ensures that a final position of the backlight is consistent with that of the CCD image sensor. Therefore, after the CCD image sensor is moved to a target position, it is necessary to wait for the backlight to be moved to the target position, which results in an extended time of the process.

In addition, there are a certain degree of vibration and a certain degree of shaking when the backlight is moved multiple times. The vibration and shaking generated during the movement of the backlight affect the accuracy of the device for inspecting the quality of the mask plate, and affect the stability and precision of the device for inspecting the quality of the mask plate, which may cause adverse effects such as deviation in the pattern of the mask plate etc. In addition, kinetic energy for the backlight is generally provided by a conveyor belt. Therefore, after the backlight is moved multiple times, abnormalities such as non-parallel movement may occur at opposite ends of the backlight, which results failure in synchronization of the backlight and the CCD image sensor at the target position, and thereby light emitted by the backlight cannot be well received by the CCD image sensor, which may eventually cause an abnormality in recognition.

FIG. 1 is a schematic oblique view illustrating a device 10 for inspecting a mask plate according to an embodiment of the present disclosure. As shown in FIG. 1, the device 10 may comprise an image sensor 110 and a light source plane 130. Further, as shown in FIG. 1, a mask plate 120 may be disposed between the image sensor 110 and the light source plane 130, wherein quality of the mask plate 120 is to be inspected. In this case, when the image sensor 110 acquires an image of a first region 125 of the mask plate 120 to inspect pixel openings of the mask plate 120 in the first region 125, one or more light sources (for example, light sources 133a shown in FIG. 2) within a corresponding range (for example, a first range 135) on the light source plane 130 on the other side of the mask plate 120 may emit light, so that actual positions of the pixel openings may be clearly recognized in the image captured by image sensor 110, and thereby the quality of the mask plate 120 is determined. More generally, one or more light sources may be controlled to emit light in a manner described below in conjunction with, for example, FIGS. 2 and/or 3.

It should be understood that a size and a position of the first region 125 shown in FIG. 1 are merely exemplary, and in other embodiments, the first region 125 may be a larger or smaller region or may be located elsewhere. As can be seen from the following description, in one embodiment, with respect to the size and the position of the first region 125, the first range in the light source plane 130 corresponding to the first region 125 may be defined as comprising at least one light source and an orthographic projection of the image sensor 110 on the light source plane 130 falls within the first range.

Further, although the image sensor 110 and the light source plane 130 (and the plurality of light sources thereon)

are illustrated as separate components in FIG. 1, the present disclosure is not limited thereto. In fact, as will be appreciated by those skilled in the art, they may be a combined device which is obtained through connection via various connections and transmission structures. Since these structures are not the focus of the present disclosure, a detailed description thereof will be omitted herein. However, this does not affect the implementation of the embodiments of the present disclosure by those skilled in the art.

Further, although in the embodiment shown in FIG. 1, the mask plate 120 is, for example, a mask plate used in a step of evaporating an organic light emitting layer in the OLED process, or in other words, the mask plate 120 may be, for example, a mask plate having physical openings, the present disclosure is not limited thereto. In some other embodiments, the mask plate 120 may be, for example, a mask plate having different light transmittances (rather than physical openings) to form a mask pattern, and may also be used for manufacturing other electronic products and/or may be applied in other steps. In this case, the accuracy of the pattern of the mask plate 120 may still be determined by capturing an image of the mask plate 120 under the backlight.

Further, although in the embodiment shown in FIG. 1, openings 122a, 122b (or more generally, light-transmissive ports) (collectively referred to as openings 122, unless otherwise specified) on the mask plate 120 are circular, the present disclosure is not limited thereto. The openings may actually have any desired shape, such as square, rectangle, diamond, circle, triangle, or any regular or irregular shape. Further, although in the embodiment shown in FIG. 1, the openings 122 (or more generally, the light-transmissive ports) on the mask plate 120 are arranged in an array, the present disclosure is not limited thereto. In fact, in some other embodiments, the openings 122 (or more generally, the light-transmissive ports) on the mask plate 120 may be arranged in any desired manner, which may totally depend on the desired use of the mask plate.

In addition, although in the embodiment shown in FIG. 1, the openings 122 (or more generally, the light-transmissive ports) on the mask plate 120 are disposed in one-to-one correspondence with the plurality of light sources on the light source plane 130, the present disclosure is not limited thereto. In some other embodiments, the openings 122 (or more generally, the light-transmissive ports) on the mask plate 120 may be disposed in "one-to-more", "more-to-one" or "more-to-more" correspondence with the plurality of light sources on the light source plane 130.

Figure 2:
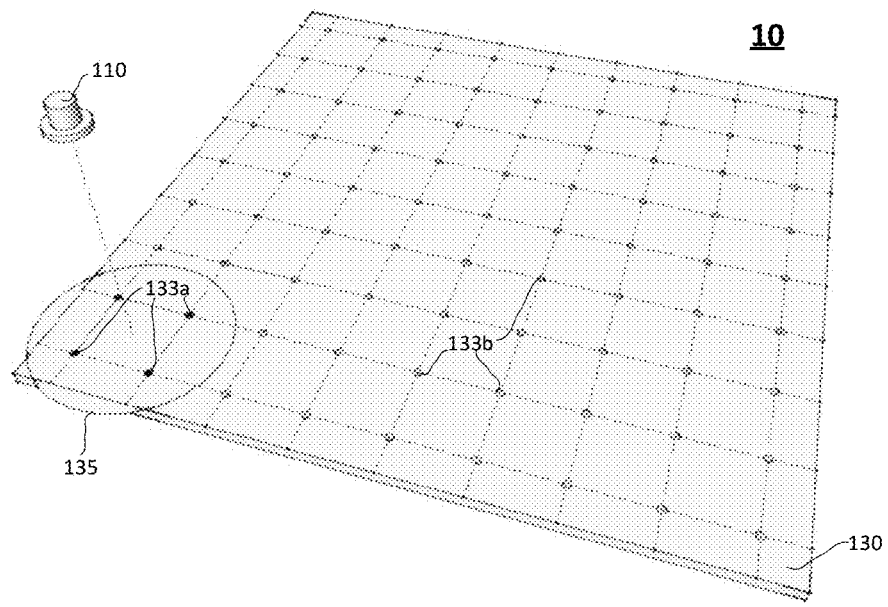
FIG. 2 is a schematic oblique view illustrating lighting of light sources within a first range according to an embodiment of the present disclosure.

FIG. 2 is a schematic oblique view illustrating lighting of the light sources 133a within the first range 135 according to an embodiment of the present disclosure. When the image sensor 110 inspects the quality of the pixel openings 122a in the first region 125 of the mask plate 120 as shown in FIG. 1, one or more light sources 133a in the first range 135 on the light source plane 130 which corresponds to the first region 125 of the mask plate 120 may be lightened to provide illumination to the image sensor 110, as shown in FIG. 2. As shown in FIG. 2, the first range 135 may be a range which is centered on the orthographic projection of the image sensor 110 on the light source plane 130 and corresponds to the first region 125 on the mask plate 120. More generally, in some embodiments, the first range 135 may correspond to the first region 125 and the orthographic projection of the image sensor 110 on the light source plane 130 falls within the first range 135.

Although the first range 135 is illustrated as a circle in FIG. 2, the present disclosure is not limited thereto. For example, the first range 135 may be a square, a rectangle, a diamond, or a triangle, or may have any regular or irregular shape. For example, in some embodiments, the first range 135 may even not have a continuous shape, but may have a shape formed by combining two or more unconnected sub-shapes. Accordingly, a shape of the first region 125 on the mask plate 120 is not limited to a circle, but may be a square, a rectangle, a diamond, or a triangle, or have any regular or irregular shape.

Further, although the first range 135 is illustrated in FIG. 2 as comprising four light sources 133a (shown as solid circles in the figure), the present disclosure is not limited thereto. In some other embodiments, the first range 135 may comprise one, two, three, five, or more than five light sources 133a.

As shown in FIG. 2, remaining light sources 133b among the plurality of light sources on the light source plane 130 other than the light sources 133a in the first range 135 may not emit light when the image sensor 110 is capturing the image of the first region 125 of the mask plate 120. Thereby, power consumption may be saved and lifetime consumption of the light sources may be reduced. The light sources 133a and the light sources 133b may be collectively referred to as light sources 133 unless otherwise specified herein.

Figure 3:
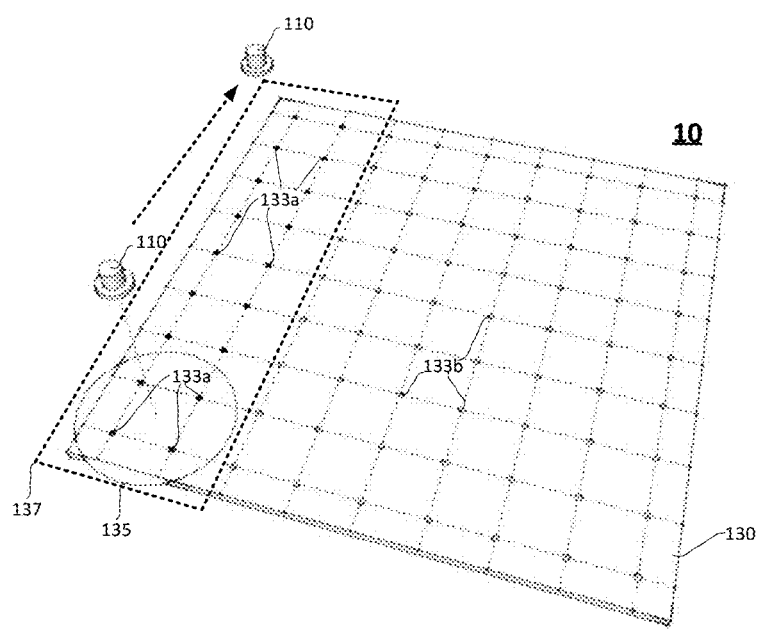
FIG. 3 is a schematic oblique view illustrating lighting of light sources within a second range according to an embodiment of the present disclosure.

FIG. 3 is a schematic oblique view illustrating lighting of light sources 133a within a second range 137 according to another embodiment of the present disclosure. Hereinafter, in order to avoid excessive description of unnecessary details, portions identical or similar to those of the embodiment shown in FIG. 2 will be omitted. Compared with the embodiment shown in FIG. 2, in the embodiment shown in FIG. 3, in addition to lighting the light sources 133a in the first range 135, the light sources 133a in the second range 137 are also lightened. In the embodiment shown in FIG. 3, the second range 137 may be a predetermined range which comprises the first range 135 and extends in an expected movement direction of the image sensor 110. For example, as shown in FIG. 3, the image sensor 110 may be moved in an arrow direction to image the mask plate 120 multiple times at different positions in that direction and determine quality of pixel openings 122a (light-transmissive ports) in different first regions 125 of the mask plate 120. In this case, by lighting the light sources 133a in the second range 137 at the same time, flicker caused by repeated turn-on and turn-off of the light sources may be reduced as compared with the embodiment shown in FIG. 2, so that the light sources have a longer lifetime.

Although the image sensor 110 is moved in a direction of a side of the light source plane 130 in the embodiment shown in FIG. 3, the present disclosure is not limited thereto. In some other embodiments, the image sensor 110 may be moved, for example, along a curved line, a diagonal line of the light source plane 130, or any regular or irregular line, and thus the second range 137 may also comprise a predetermined range which extends in these directions.

Thus, by using the backlight design described above, the original moving backlight design may be changed to a stationary backlight design, that is, light from the plurality of light sources 133 in the range is utilized to realize the illumination requirements of the original backlight. The plurality of light sources 133a in different regions may be automatically controlled to emit light in conjunction with a position of the image sensor 110 on top of the light sources 133a. Therefore, the original problem that the accuracy of the device is adversely affected when the image sensor is synchronized with the moving backlight may be avoided, and the stability and precision of the device are improved, thereby improving the precision of the manufactured mask plate.

Figure 4:
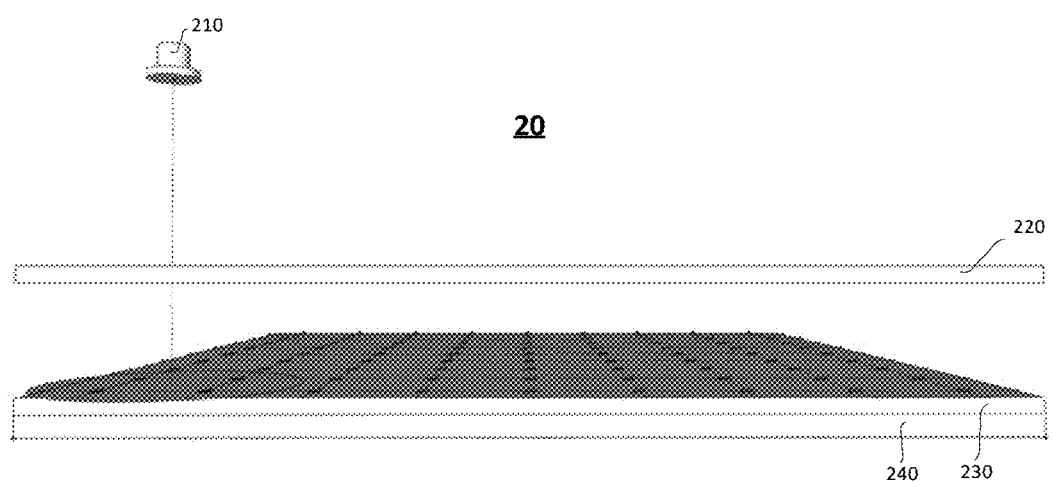
FIG. 4 is a schematic side view illustrating a device for inspecting a mask plate according to another embodiment of the present disclosure.

FIG. 4 is a schematic side view illustrating a device 20 for inspecting a mask plate according to another embodiment of the present disclosure. Hereinafter, in order to avoid excessive description of unnecessary details, portions identical or similar to those of the embodiments shown in FIGS. 2 and 3 will be omitted. Compared with the embodiments illustrated in FIGS. 2 and 3, in the embodiment illustrated in FIG. 4, the device 20 may further comprise a light source supporting structure 240 (for example, a backlight machine station). Thereby, a light source plane 230 may be supported by the light source supporting structure 240 and may be moved with respect to a mask plate 220 to be inspected in a longitudinal direction shown in FIG. 4 under action of the light source supporting structure, so that a plurality of light sources on the light source plane 230 may be moved with respect to the mask plate 220 in a light-exiting direction. In this case, spacing between the respective light sources and the mask plate 220 may be adjusted, so that illumination required to recognize pixel openings of the mask plate 220 may be better satisfied.

It should be illustrated, however, that although the light source plane 230 and the light source supporting structure 240 are illustrated as two separate components in FIG. 4, the present disclosure is not limited thereto. In some other embodiments, the light source plane 230 and the light source supporting structure 240 may be an integrally formed structure, that is, the light source plane 230 itself may be moved with respect to the mask plate 220 to change the spacing between the respective light sources on the light source plane 230 and the mask plate 220.

Figure 5:
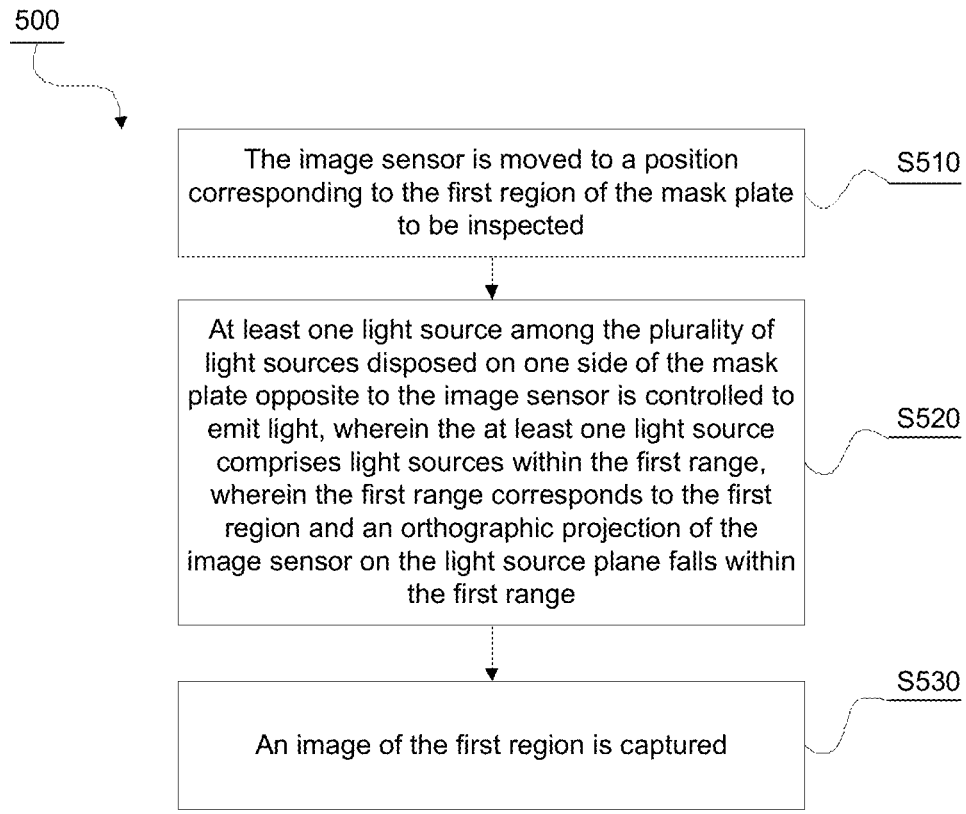
FIG. 5 is a flowchart illustrating an exemplary method for inspecting a mask plate according to an embodiment of the present disclosure.

Next, a method for inspecting a mask plate according to an embodiment of the present disclosure will be described in detail with reference to FIG. 5. FIG. 5 is a flowchart illustrating an exemplary method 500 for inspecting a mask plate according to an embodiment of the present disclosure. As shown in FIG. 5, the method 500 may comprise steps S510, S520, and S530. According to some embodiments of the present disclosure, some of the steps of the method 500 may be performed separately or in combination, may be performed in parallel or sequentially, and are not limited to a specific operational order shown in FIG. 5.

The method 500 starts at step S510, in which the image sensor 110 may be moved to a position corresponding to the first region 125 of the mask plate 120 to be inspected.

In step S520, at least one light source 133a among the plurality of light sources 133 disposed on one side of the mask plate 120 opposite to the image sensor 110 may be controlled to emit light, wherein the at least one light source 133a may comprise light sources 133a within the first range 135, wherein the first range 135 corresponds to the first region 125 and an orthographic projection of the image sensor 110 on the light source plane 130 falls within the first range 135.

In step S530, an image of the first region 125 may be captured.

In some embodiments, the at least one light source 133a may further comprise light sources within the second range 137, and the second range 137 may be a predetermined range which comprises the first range 135 and extends in an expected movement direction of the image sensor 110. In some embodiments, the method 500 may further comprise: controlling remaining light sources 133b among the plurality of light sources other than the at least one light source 133a to not emit light when the image sensor 110 is capturing an image of the first region 125 of the mask plate 120. In some embodiments, the method 500 may further comprise: controlling the plurality of light sources 133 to move with respect to the mask plate 120 in a light-exiting direction by moving the light source supporting structure 140 configured to support the plurality of light sources 133.

Figure 6:
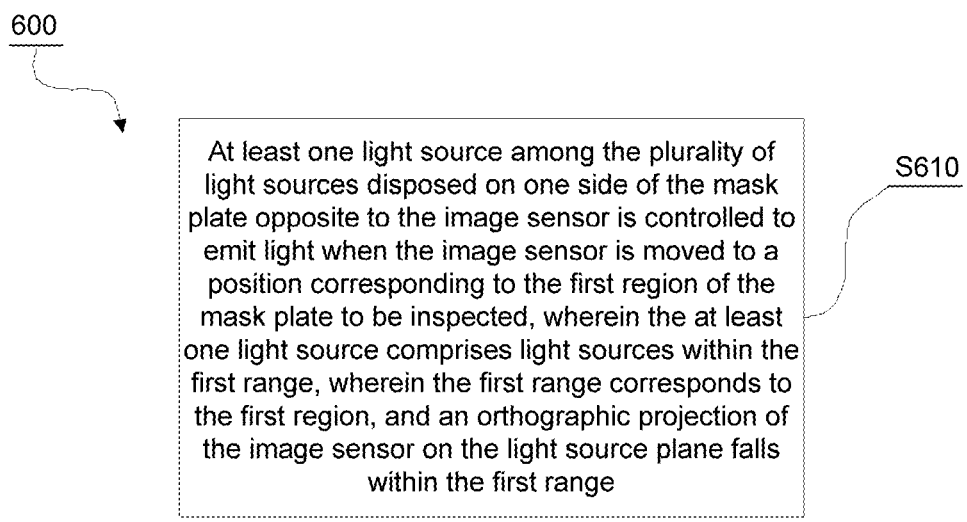
FIG. 6 is a flowchart illustrating an exemplary method for controlling light sources when a mask plate is inspected according to an embodiment of the present disclosure.

Next, a method for controlling light sources when a mask plate is inspected according to an embodiment of the present disclosure will be described in detail with reference to FIG. 6. FIG. 6 is a flowchart illustrating an exemplary method 600 for controlling light sources when a mask plate is inspected according to an embodiment of the present disclosure. As shown in FIG. 6, the method 600 may comprise step S610.

The method 600 starts at step S610, in which at least one light source 133a among the plurality of light sources 133 disposed on one side of the mask plate 120 opposite to the image sensor 110 is controlled to emit light when the image sensor 110 is moved to a position corresponding to the first region 125 of the mask plate 120 to be inspected, wherein the at least one light source 133a may comprise light sources 133a within the first range 135, wherein the first range 135 corresponds to the first region 125, and an orthographic projection of the image sensor 110 on the light source plane 130 falls within the first range 135.

In some embodiments, the at least one light source 133a may further comprise light sources 133a within the second range 137. The second range 137 may be a predetermined range which comprises the first range 135 and extends in an expected movement direction of the image sensor 110. In some embodiments, the method 600 may further comprise: controlling remaining light sources 133b among the plurality of light sources 133 other than the at least one light source 133a to not emit light when the image sensor 110 is capturing an image of the first region 125 of the mask plate 120. In some embodiments, the method 600 may further comprise: controlling the plurality of light sources 133 to move with respect to the mask plate 120 in a light-exiting direction by moving the light source supporting structure 140 configured to support the plurality of light sources 133.

Thus, by using the backlight design described above, the original moving backlight design may be changed to a stationary backlight design, that is, light from the plurality of light sources 133 in the range is utilized to realize the illumination requirements of the original backlight. The plurality of light sources 133a in different regions may be automatically controlled to emit light in conjunction with a position of the image sensor 110 on top of the light sources 133a. Therefore, the original problem that the accuracy of the device is adversely affected when the image sensor is synchronized with the moving backlight may be avoided, and the stability and precision of the device are improved, thereby improving the precision of the manufactured mask plate.

The present disclosure has been described so far in connection with the embodiments. It should be understood that various other changes, substitutions and additions may be made by those skilled in the art without departing from the spirit and scope of the present disclosure. Therefore, the scope of the present disclosure is not limited to the specific embodiments described above, but is defined by the appended claims.

In addition, the functions described herein as being implemented by pure hardware, pure software, and/or firmware may also be implemented by dedicated hardware, a combination of general-purpose hardware and software, etc. For example, functions described as being implemented by dedicated hardware (for example, Field Programmable Gate Array (FPGA), Application Specific Integrated Circuit (ASIC), etc.) may be implemented in a manner of a combination of general-purpose hardware (for example, Central Processing Unit (CPU), Digital Signal Processor (DSP)) and software, and vice versa.

We claim:

1. A device for inspecting a mask plate, the mask plate being divided into a plurality of regions, the device comprising:
   an image sensor configured to move in a path to capture an image of different regions of the mask plate; and
   a plurality of light sources on a light source plane disposed on one side of the mask plate opposite to the image sensor, the plurality of light sources being arranged in an array and divided into the plurality of ranges,
   wherein at least one light source of the plurality of light sources is configured to emit light when the image sensor is capturing an image of a first region of the plurality of regions of the mask plate, and
   wherein the at least one light source comprises light sources within a first range of the plurality of ranges, wherein the first range corresponds to the first region and an orthographic projection of the image sensor on the light source plane falls within the first range,
   wherein remaining ones of the plurality of light sources other than the at least one light source are configured not to emit light when the image sensor is capturing the image of the first region of the mask plate, and
   wherein the plurality of light sources are disposed on a light source supporting structure, wherein the light source supporting structure enables the plurality of light sources to move with respect to the mask plate in a light-exiting direction, so as to adjust spacing between the light sources and the mask plate, respectively.

2. The device according to claim 1, wherein the at least one light source further comprises light sources within a second range, wherein the second range is a predetermined range which comprises the first range and extends in an expected movement direction of the image sensor.

3. A method for inspecting a mask plate, the mask plate being divided into a plurality of regions, the method comprising:
   moving an image sensor to a position corresponding to a first region of the plurality of regions of the mask plate to be inspected;
   controlling at least one light source of a plurality of light sources on a light source plane, which is disposed on one side of the mask plate opposite to the image sensor, to emit light, and controlling remaining ones of the plurality of light sources other than the at least one light source not to emit light, the plurality of light sources being arranged in an array and divided into a plurality of ranges; and
   capturing an image of the first region by the image sensor,
   wherein the at least one light source comprises light sources within a first range of the plurality of ranges, wherein the first range corresponds to the first region and an orthographic projection of the image sensor on the light source plane falls within the first range,
   wherein the plurality of light sources are disposed on a light source supporting structure, wherein the light source supporting structure enables the plurality of light sources to move with respect to the mask plate in a light-exiting direction, so as to adjust spacing between the light sources and the mask plate, respectively.

4. The method according to claim 3, wherein the at least one light source further comprises light sources within a second range, wherein the second range is a predetermined range which comprises the first range and extends in an expected movement direction of the image sensor.

5. A method for controlling light sources when a mask plate is inspected, the mask plate being divided into a plurality of regions, the method comprising:
   controlling at least one light source of a plurality of light sources on a light source plane, which is disposed on one side of the mask plate opposite to an image sensor, to emit light, when the image sensor is moved to a position corresponding to a first region of the plurality of regions of the mask plate to be inspected, the plurality of light sources being arranged in an array and divided into a plurality of ranges and
   controlling remaining ones of the plurality of light sources other than the at least one light source not to emit light when the image sensor is capturing an image of the first region of the mask plate,
   wherein the at least one light source comprises light sources within a first range of the plurality of ranges, wherein the first range corresponds to the first region and an orthographic projection of the image sensor on the light source plane falls within the first range
   wherein the plurality of light sources are disposed on a light source supporting structure, wherein the light source supporting structure enables the plurality of light sources to move with respect to the mask plate in a light-exiting direction, so as to adjust spacing between the light sources and the mask plate, respectively.

6. The method according to claim 5, wherein the at least one light source further comprises light sources within a second range, wherein the second range is a predetermined range which comprises the first range and extends in an expected movement direction of the image sensor.

* * * * *